United States Patent
Beale et al.

(10) Patent No.: US 8,276,128 B2
(45) Date of Patent: Sep. 25, 2012

(54) SYSTEMS, METHODS, AND COMPUTER PROGRAMS FOR DYNAMIC BINARY TRANSLATION IN A MASTER CONTROL PROGRAM INTERPRETER

(75) Inventors: Andrew Ward Beale, Mission Viejo, CA (US); Robert Joseph Meyers, Garden Grove, CA (US); Loren C. Wilton, Rancho Cucamonga, CA (US)

(73) Assignee: Unisys Corporation, Blue Bell, PA (US)

( * ) Notice: Subject to any disclaimer, the term of this patent is extended or adjusted under 35 U.S.C. 154(b) by 734 days.

(21) Appl. No.: 12/502,285

(22) Filed: Jul. 14, 2009

(65) Prior Publication Data

US 2011/0016458 A1   Jan. 20, 2011

(51) Int. Cl.
*G06F 9/45* (2006.01)
(52) U.S. Cl. ......................................... 717/139; 717/137
(58) Field of Classification Search .................. None
See application file for complete search history.

(56) References Cited

U.S. PATENT DOCUMENTS

| | | | | |
|---|---|---|---|---|
| 6,289,505 B1 * | 9/2001 | Goebel | | 717/153 |
| 7,203,933 B2 * | 4/2007 | Souloglou et al. | | 717/146 |
| 7,299,460 B2 * | 11/2007 | Kumura | | 717/137 |
| 7,536,682 B2 * | 5/2009 | Dankel et al. | | 717/139 |
| 7,644,210 B1 * | 1/2010 | Banning et al. | | 710/100 |
| 7,761,857 B1 * | 7/2010 | Bedichek et al. | | 717/138 |
| 2009/0099834 A1 * | 4/2009 | Irving et al. | | 703/27 |

* cited by examiner

*Primary Examiner* — Elias Mamo
(74) *Attorney, Agent, or Firm* — James E. Goepel

(57) ABSTRACT

Various embodiments of systems and methods for dynamic binary translation in an interpreter are disclosed. An embodiment comprises a method for dynamic binary translation in an interpreter. One such method comprises: receiving non-native code comprising a sequence of one or more operators to be interpreted; building a static branch destination table associated with the operators, the static branch destination table specifying a static branch operator that branches to another operator in the sequence and a corresponding memory location to which the static branch operator branches; parsing the sequence of operators and building a cross-reference table that specifies a pointer to an operator function associated with the corresponding operator, an index of the operator in a native code sequence, and a call to a native operator; selecting a dynamic branch code template for the native operator; and based on the static branch table and the cross-reference table, emitting the native code sequence to be executed via a native processor.

14 Claims, 6 Drawing Sheets

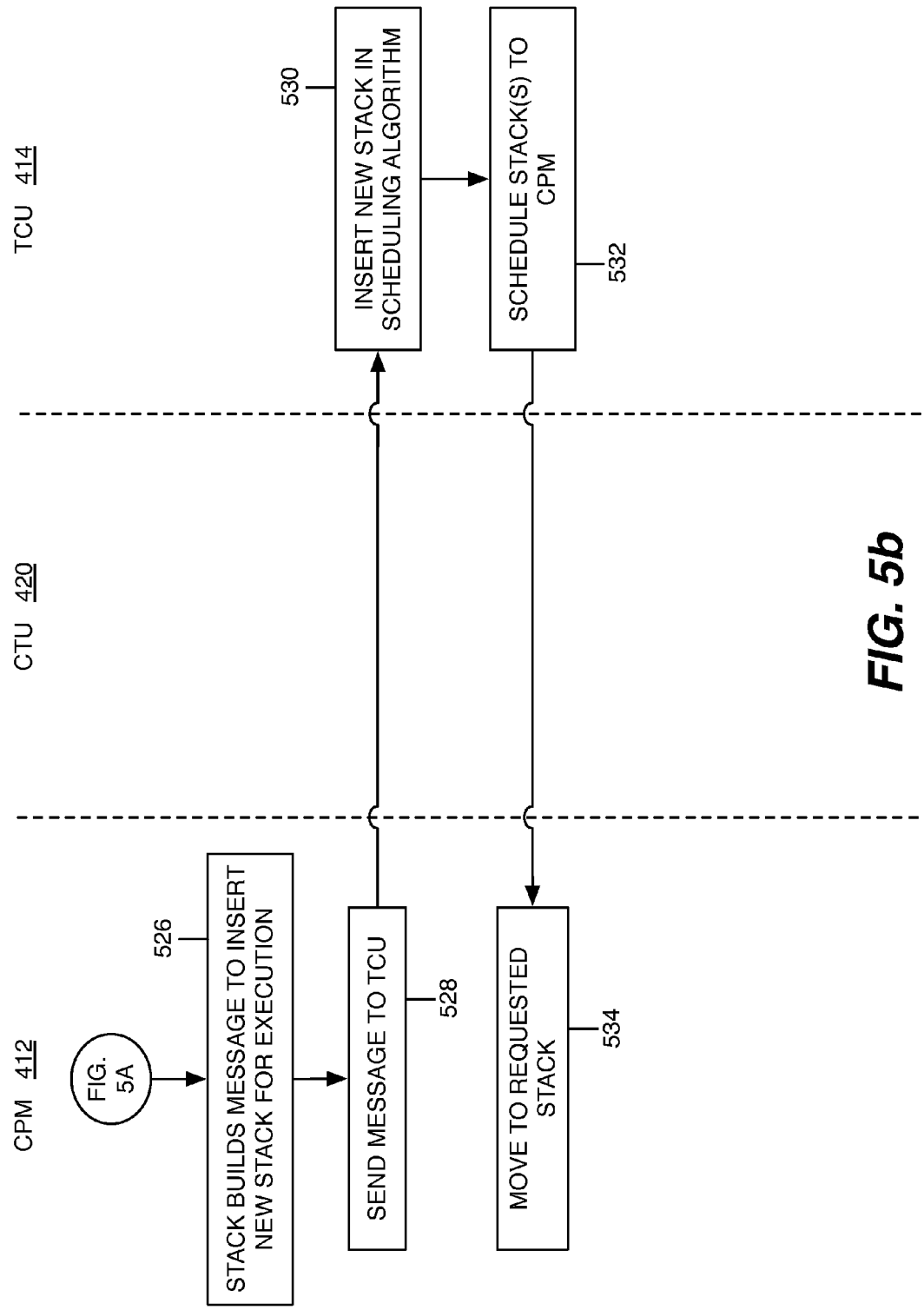

SYSTEMS, METHODS, AND COMPUTER PROGRAMS FOR DYNAMIC BINARY TRANSLATION IN A MASTER CONTROL PROGRAM INTERPRETER

BACKGROUND

Interpreters are a special class of programs that interpret instructions (e.g., opcodes, bytecodes, operators, etc.) that are different than the native instruction set of the machine upon which the interpreter is executing. The interpreter generally comprises a program or other logic configured to receive the code to be executed (e.g., a code file) and translate the non-native computer instructions, typically written in a high-level programming language, into native computer instructions.

Many interpreters are configured with an "inner loop" that is typically performed on each instruction or operator in the code to be executed via the interpreter. The inner loop consists of a fetch cycle, a decode cycle, and an execution cycle. The fetch cycle involves fetching the next instruction or operator in the code. In the decode cycle, a fetched interpreted operator is translated into a series of native instructions that implement the interpreted operator. The series of native instructions are typically organized as a collection of operator functions or subroutines with a one-to-one correspondence between subroutine and interpreted operator. The decode cycle determines, based on the interpreted opcode, which of the subroutines it needs to execute in the execution cycle. The execution cycle involves executing the actual native operators via native machine code. At the end of each loop, a branch operator is then executed to transfer control back to fetch cycle. This loop is executed once per operator or instruction, and contributes greatly to the overall performance of the interpreter.

In some interpreter implementations, a significant loss of performance may result from a pipeline stall that occurs at the point where the inner loop enters the execution cycle. For example, the actual call or switch to the machine code that implements the interpreted operator may cause a branch prediction failure because the native processor is unable to predict the location of the final destination address of the machine code implementing the interpreted operator. The branch prediction failure may require the instruction pipeline to be flushed and reloaded, which results in additional processor clock cycles. The additional clock cycles may significantly reduce the overall performance of the interpreter. Furthermore, if the operator being called is relatively short (in terms of clock cycles), the additional clock cycles may be a significant part of the entire operator execution time.

Despite the many advantages and the commercial success of interpreters, there remains a need in the art for ways to reduce the overhead of the inner loop and make available more processing cycles that may be applied to the operator execution for a corresponding increase in performance.

SUMMARY

Various embodiments of systems and methods for dynamic binary translation in an interpreter are disclosed. An embodiment comprises a method for performing dynamic binary translation in a Master Control Program (MCP) environment on a native processor. The MCP environment comprises a central processor module (CPM), a task control unit (TCU), and a code translation unit (CTU) for implementing the dynamic binary translation. One such method comprises: the CPM reading E-Mode code from a memory prior to execution; the CPM generating and sending a first message to the CTU, the first message comprising a reference to the E-Mode code to be translated and a translation complete event to be caused when translation of the E-Mode code is completed; the CPM generating and sending a second message to the TCU, the second message configured to cause a first stack to wait for the translation complete event, the first stack comprising at least a first portion of the E-Mode code to be translated; based on the second message, the TCU instructing the CPM to move to a second stack comprising at least a second portion of the E-Mode code to be translated; based on the first message, the CTU translating the first portion of the E-Mode code to native code; the CTU generating and sending a third message to the TCU, the third message configured to cause the translation complete event; based on the third message, the TCU causing the translation complete event; the TCU preparing the second stack and scheduling the CPM to the second stack; and the CPM executing the native code.

BRIEF DESCRIPTION OF THE DRAWINGS

FIGS. 5*a* & 5*b* are a flow chart illustrating an embodiment of a method for performing dynamic binary translation in the system of FIG. 4.

DETAILED DESCRIPTION

Figure 1:
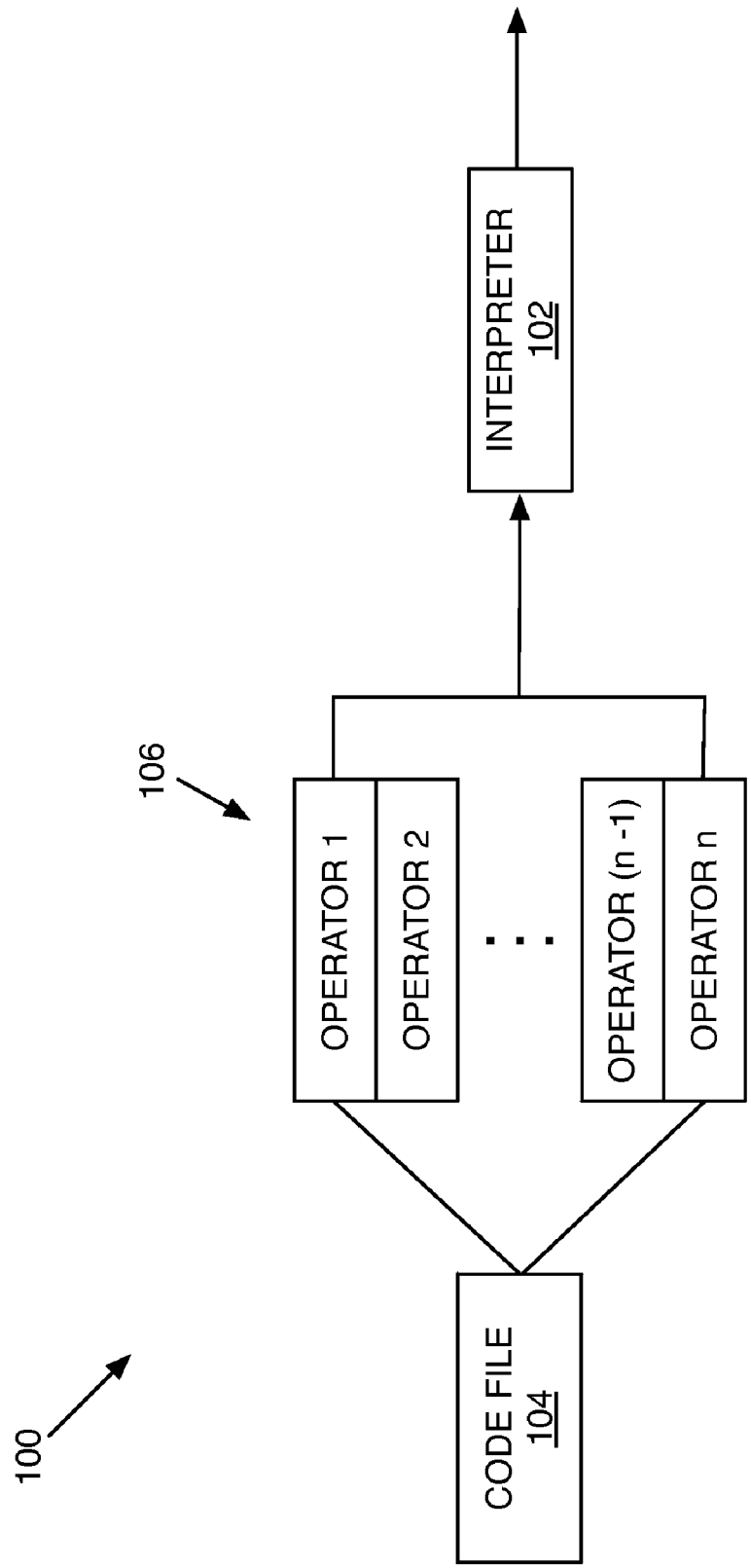
FIG. 1 is a block diagram illustrating an embodiment of an interpreter for performing dynamic binary translation.

Various embodiments of systems, methods, and computer programs are disclosed for implementing dynamic binary translation in an interpreter. FIG. 1 illustrates an exemplary working environment 100 for dynamically translating binary code in an interpreter 102. In general, the interpreter 102 receives a code file 104 comprising one or more operators 106 associated with an instruction set of a processor for which the code file 104 is written. The instruction set the interpreter 102 executes is different than the instruction set the interpreter 102 is compiled into. In this regard, the instruction set or operators 106 associated with the code file 104 may be referred to as "non-native" or "foreign" instructions or operators, while the instruction set of the processor may be referred to as the "native" instruction set. The terms "native" and "non-native" or "foreign" should be understood to merely convey that the code file 104 does not execute directly on the native processor. The interpreter 102 translates the operators 106 into the corresponding machine code for the native instruction set, and executes the native machine code. In this regard, it should be further appreciated that dynamic binary translation refers to the process of translating the binary code in an interpreter from the non-native code to the native code.

It should be appreciated that the interpreter 102 may be configured to support any desirable native and foreign instructions sets, as dictated by the particular implementations of the underlying machines and the software applications. Furthermore, depending on such implementations, it should be further appreciated that the interpreter 102 may be configured in numerous ways to interpret the code and implement the dynamic binary translation. For purposes of illustrating certain principles of the dynamic binary translation, in an embodiment, the interpreter 102 may be described as executing the operators 104 on a native Intel-based machine. One of ordinary skill in the art will appreciate, however, that the principles of the dynamic binary translation may be readily applied to other computer systems, native instruction sets, foreign instruction sets, and applications.

Figure 2:
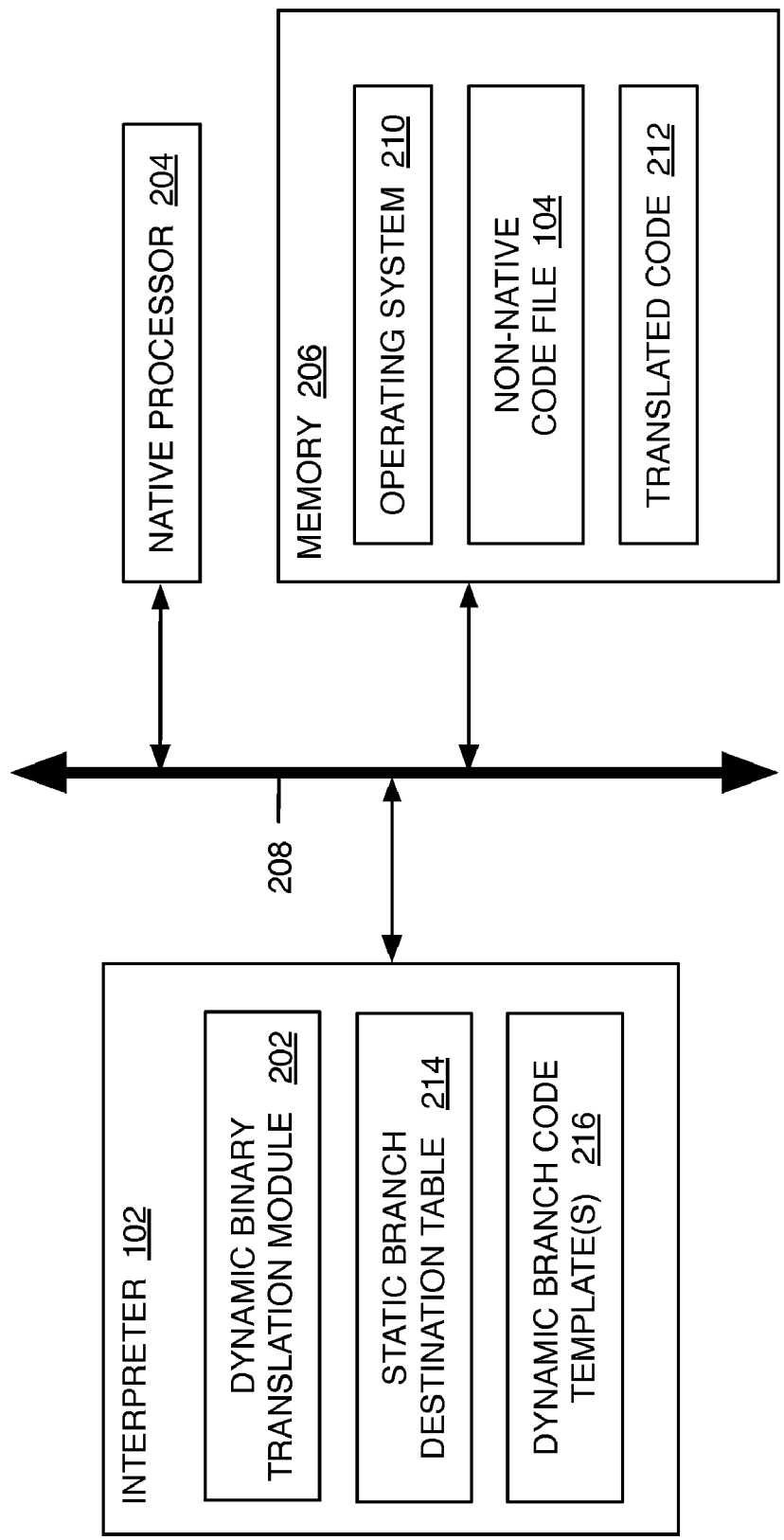
FIG. 2 is a block diagram illustrating an embodiment of a system for implementing dynamic binary translation in the interpreter of FIG. 1.

FIG. 2 illustrates an embodiment of an implementation of the interpreter 102. As illustrated in FIG. 2, the interpreter 102 operates on a native processor 204. The interpreter 102 may interface with the native processor 204 and an associated memory 206 via an interface 208. The interpreter 102 may be implemented in hardware, software, firmware, or any combination thereof. Although illustrated as a separate element in FIG. 2, it should be appreciated that in software embodiments the interpreter 102 may reside in memory 206. Memory 206 may further comprise an operating system 210 for controlling the operation of the underlying device, and a non-native code file 212 to be executed by the interpreter 102.

The interpreter 102 comprises a dynamic binary translation module 202, which generally comprises the logic or functionality for the dynamically translating binary code from the non-native environment to the native environment. As described in more detail below, the dynamic binary translation module 202 receives or otherwise accesses a non-native code file 212 comprising one or more operators 106 to be interpreted. It should be appreciated that the operators 106 may comprise, for example, bytecodes or opcodes depending on the particular non-native instruction set and the underlying programming language. The dynamic binary translation module 202 parses the sequence of foreign operators 106, translates the operators 106, and dynamically generates, prior to execution of the interpreted operators, a new sequence of machine code (i.e., translated code 212). The translated code 212 may be dynamically emitted and executed by the native processor 204. For example, the translated code 212 may comprise a sequence of back-to-back calls or switches to the routines that execute the interpreted operators. The translated code 212 provides a modified instruction stream to the native processor 204. The modified instruction stream is configured such that the branch prediction logic of the native processor 204 has sufficient information to correctly determine the location of the instruction pointer (from instruction to instruction) without having to fetch from memory 206. In this manner, the dynamic binary translation module 202 eliminates the need for the fetch-decode-execute loop, as described above, which may cause an undesirable pipeline stall and consequent loss of performance.

As mentioned above, the interpreter 102 may support any desirable native processor 204. In one implementation, the translated code 212 may be configured as a series of calls to the memory addresses of the locations of the interpreted operators. For example, in embodiments supporting an Intel-based native processor, the calls to the operators may comprise an Intel instruction of the form: Call [32-bit displacement]. This instruction may be properly predicted because the Intel native processor may calculate the target address by adding the 32-bit displacement to the current address of the instruction pointer. This allows the code to be prefetched by the Intel native processor, and no pipeline flush is required.

Figure 3:
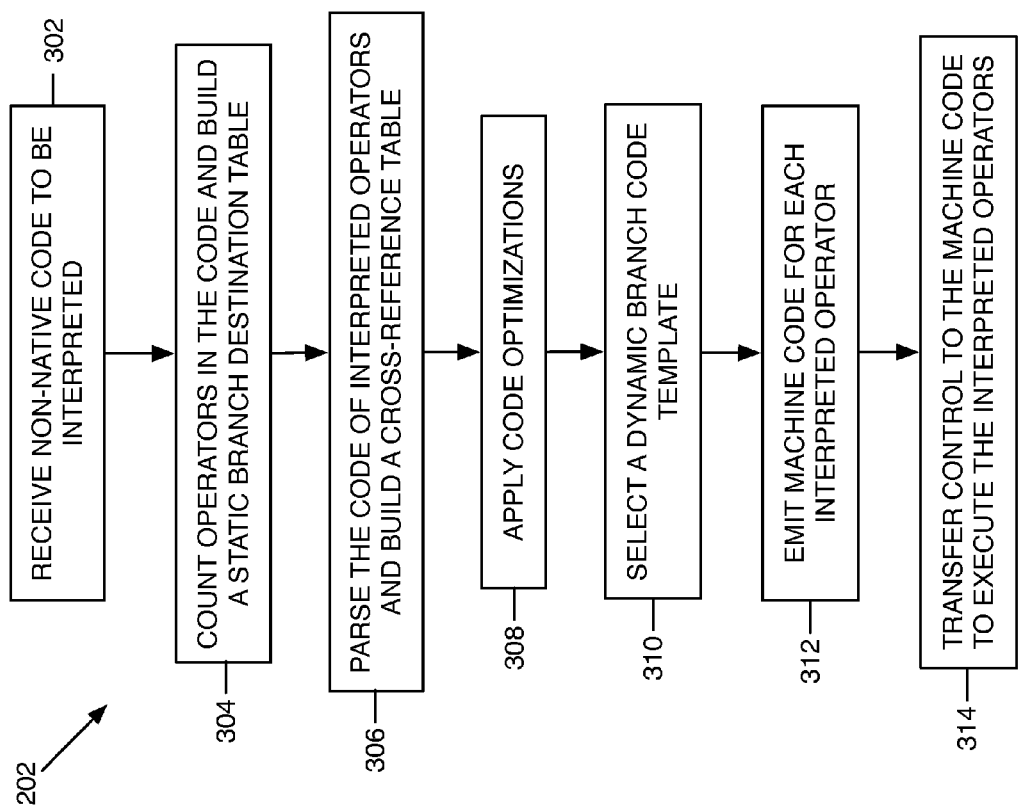
FIG. 3 is a flow chart illustrating the architecture, operation, and/or functionality of the dynamic binary translation module of FIG. 2.

FIG. 3 illustrates an embodiment of the architecture, operation, and/or functionality of the dynamic binary translation module 202. The dynamic binary translation module 202 may be implemented in software, hardware, firmware, or any combination thereof. In certain embodiments, the module(s) may be implemented in software or firmware that is stored in a memory (e.g., shared memory 206) and/or associated components and that are executed by the interpreter 102 and/or the native processor 204, or any other processor(s) or suitable instruction execution system. In software or firmware embodiments, the logic may be written in any suitable computer language. One of ordinary skill in the art will appreciate that any process or method descriptions associated with the operation of the dynamic binary translation module 202 may represent modules, segments, logic or portions of code which include one or more executable instructions for implementing logical functions or steps in the process. It should be further appreciated that any logical functions may be executed out of order from that described, including substantially concurrently or in reverse order, depending on the functionality involved, as would be understood by those reasonably skilled in the art. Furthermore, the modules may be embodied in any computer readable medium for use by or in connection with an instruction execution system, apparatus, or device, such as a computer-based system, processor-containing system, or other system that can fetch the instructions from the instruction execution system, apparatus, or device and execute the instructions.

Referring to FIG. 3, at block 302, the dynamic binary translation module 202 receives code associated with the non-native code file 104. The dynamic binary translation module 202 may receive the code as code segments, portions of code, or otherwise. In this regard, it should be appreciated that the non-native code file 104 may originate from the device on which the interpreter 102 is operating or, in other embodiments, may be provided to the device via a communication network or other input/output mechanism located on, or remote from, the device.

It should be appreciated that the non-native code (e.g., non-native code file 104) may be received in any number of ways. In an embodiment, an interpreted operating system may send a message to, for example, logic associated with the dynamic binary translation module 202 or associated hardware, software, or firmware. The interpreted operating system may interface with a code translation unit that implements the dynamic binary translation algorithm by executing the logic associated with one or more of blocks 304, 306, 308, 310 and 312. In an alternative embodiment, the interpreter 102 may detect that no translated code exists for a non-native code stream it is about to enter, and invoke the dynamic binary translation algorithm. In this embodiment, upon completion of block 312, the interpreter 102 may execute the translated code 212 as instructed via block 314. One of ordinary skill in the art will appreciate, however, that regardless of which methodology is employed, the dynamic binary translation algorithm may be provided an address that points to the non-native code to be translated.

At block 304, the dynamic binary translation module 202 counts the operators 106 in the code and detects any static branches by determining whether any operators 106 branch to other operators in the code. The dynamic binary translation module 202 may build a static branch destination table 214, which specifies an operator 106 and a corresponding location to which the operator 106 branches. In an embodiment, the non-native code segment may be scanned starting at the address supplied by block 302. Each operator 106 increments an operator counter variable that identifies the total number of operators 106 in the segment, upon completion of block 304. As each operator 106 is counted, if a static branch operator is encountered, the destination of the static branch may be flagged as a branch destination using, for example, a Boolean array indexed by an operator number in the segment. As known in the art, a static branch refers to a branch in which the destination offset is supplied as a parameter to the operator 106. The static branch destination table 214 may be used to prevent optimizations that may eliminate the branch destination as an operator boundary, thereby rendering the branch operator invalid. For example, given a sequence of three operators (operators A, B, and C), if operator B is the target of a static branch, the three operators A, B, and C may not be concatenated in such a way that B is no longer at the beginning of an operator sequence. Therefore, a concatenation of A, B, and C would be invalid, but a concatenation of B and C would be valid. A concatenation of just A and B would also be invalid. It should be appreciated that alternative structures and methods may be used to implement the static branch destination table 214.

At block 306, the dynamic binary translation module 202 parses the code stream of interpreted operators. The non-native code segment is parsed, and a data structure (e.g., a cross-reference table) may be built containing all the necessary information for each operator 106 so that optimizations may be performed. The data structure may include various data fields. Table 1 below illustrates an exemplary embodiment of various fields that may be included in the data structure.

TABLE 1

| Field | Description |
| --- | --- |
| CpmOpFunction emOpFunc; | // pointer to the operator function |
| codeParameters oParams; | // parameter(s) for this operator |
| unsigned long emOpIndex; | // index of this operator in the translated native code |
| nCallType callType; | // native operator call skeleton type |

Each operator 106 in the non-native code segment may be processed for any desirable optimization technique. For example, concatenation may be implemented. When multiple operators 106 are concatenated, instead of N calls to implementations of individual operators, there may be a single call to an implementation that executes the N operators as a single "super-operator". It should be appreciated that this may allow the implementation of the concatenated operator to use additional optimization techniques, such as, for example, foreknowledge of how to optimally feed the output of one operator into the input of the immediately following operator.

Another type of optimization that can be done during the parse of the non-native code is called operator specialization. This technique employs multiple implementations of an operator, but each implementation has a unique set of assumptions that can make further optimization possible. Take for example an ADD operator which takes two arguments, adds them together, and produces a sum. The ADD operator may be capable of accepting integers, floating point, IEEE format, or any combination of arithmetic formats for the arguments, and producing a sum that represents the addition of the two arguments. However, if it can be determined from examination of the code stream, that both arguments being input to the ADD operator are integers, a special form of the ADD operator can be called which assumes that the two arguments are integers and will produce the correct sum assuming the assumption is valid. All the specialized code in the generic ADD operator which determines what form the arguments are in can be eliminated in the specialized form, as the testing has occurred during the code parsing and the specialized ADD operator which is being invoked is guaranteed to have its assumptions met and will produce the sum faster than the generic ADD operator.

It should be appreciated that the optimization techniques described above (as well as other techniques) may be performed in association with block 306 or, in other implementations, may be performed before or after block 306.

Referring to block 310, after the operator implementation to be called is determined, an appropriate native-code template (e.g., dynamic branch code template 216) may be selected that matches the attributes of the implementation. For example, if an implementation is expecting two parameters, then a native-code template that passes two parameters may be selected. As illustrated in FIG. 1, the native-code templates may be stored in memory 206 or otherwise accessible by the system 100. It should be appreciated that the native-code templates may be implemented in various ways.

In an embodiment, the native-code templates comprise small sequences of native code, which are filled in by the dynamic binary translation module 202. When filled in completely by the dynamic binary translation module 202, the native-code templates result in the execution of the interpreted operator(s). The native-code templates may be generated automatically or manually based on, for example, the routines that implement the interpreted operators, the native instruction set of the processor executing the translated code, and/or the instruction set of the interpreted code file 104. An individual writing a code template may characterize the operators of the interpreted code file 104. The characterization may depend on the attributes of the code stream. For example, operators may have zero, one, two, or more parameters included as part of the code stream. Each of these may have a separate code template. Other operators may physically reside at certain physical locations (for example a mod 8 boundary of an address). In general, the individual may create a template for each condition that may be encountered in the parsing of an interpreted code stream.

The individual may have knowledge about what parameters the subroutines or functions that implement the interpreted operators require to function properly. Furthermore, the routines may conform to the ABI (Application Binary Interface) of the native hardware/software environment in which the interpreter 102 is executing. In an embodiment, when compiling the routines with industry standard compilers, the compilers may ensure compliance with the ABI. When translating code, it is the responsibility of, for example, a code emitter to ensure that the code is compliant with the ABI. An aspect of the ABI may involve restrictions or conventions on which native registers are used to pass parameters to subroutines. Therefore, it should be appreciated that the code templates may put the parameters required by the subroutines in the proper registers as required by the ABI. An implementer may emit a sequence of native operators which, for a given template, put the parameters as required by the interpreter subroutines in the proper registers as required by the ABI, and back fill address/data values into the code stream which may be required to ensure predictability.

To further illustrate an embodiment of a code template in an exemplary working environment, consider the following template:

```
unsigned char CodeOp_2 [CODEOP_2_SIZE] =
{
  0x41, 0xB8, 0x00, 0x00, 0x00, 0x00, // mov r8d, <32-bit literal>; param #2
  0xBA, 0x00, 0x00, 0x00, 0x00,       // mov edx, <32-bit literal>; param #1
  0x48, 0x8B, 0xCB,                   // mov rcx, rbx; Put "this" into rcx for Emode operator call
  0xE8, 0x00, 0x00, 0x00, 0x00        // Call near with 32-bit displacement
};
```

This template may be designed for use when invoking an interpreter operator that expects two parameters. Since the interpreter is implemented in C++, the routine is expecting the first parameter to be the "this" pointer. The template may include machine code that moves the second parameter into the r8d, which the ABI may dictate is for the third parameter. The "this" parameter may be included in the ABI, but defined as a hidden parameter from the perspective of the C++ programmer because the compiler sees that it is passed and the programmer did not have to explicitly pass it. The template moves the first parameter into the edx register, which the ABI may state is for the second parameter. The template moves "this" parameter into the rcx register from the rbx register. The ABI may state that the first parameter is passed in rcx. It may be compiler dependent upon where "this" parameter is sourced from.

The bytes comprising 0x00 in the above template may be bytes that are backfilled with data. In this case, the bytes being moved into the r8d and edx registers are determined from the interpreted code stream, and the 32-bit displacement for the call near instruction may be determined by calculating the difference of the address of the byte following the final byte of this template in the translated code, and the address of first byte of the instruction in the subroutine or function that implements the interpreted operator being called. In this manner, the native processor knows precisely where to fetch the code from for the call instruction and not incur a pipeline stall.

Referring again to FIG. 3, at block 312, the dynamic binary translation module 202 emits the machine code for each interpreted operator. Once every non-native operator in the segment has been completely analyzed and templates have been selected, the sequence of native code can be emitted. A new memory area may be allocated that completely lies within the address range of the particular native processor instruction architecture. For example, in implementations supporting the Intel® instruction set in which calls to an operator use a call instruction of the form CALL [32-bit displacement], 2 GB of memory may be allocated in accordance with the 32-bit displacement. Then, within this allocated memory, the native-code templates may be arranged in sequence, and all code bytes which need to be backfilled based on code values or offsets within the native code may be filled-in giving a completely predictable sequence of machine code which accurately represents the sequence of non-native operators which was the original code to be executed. The new translated code 212 is fully predictable to the branch prediction logic of the native processor 204. In this manner, the interpreter 102 may eliminate the problem of pipeline stalls described above without the translated code 212. As described above, in existing solutions, the actual call or switch to the machine code that implements the interpreted operator may cause a branch prediction failure because the native processor is unable to predict the location of the final destination address of the machine code implementing the interpreted operator. The translated code 212 eliminates this issue, thereby resulting in a significant performance increase of the interpreter 102.

At block 314, the dynamic binary translation module 202 transfers control to the machine code to enable execution of the interpreted operators. Depending upon how the trigger event (block 302) is implemented, invoking the execution of the emitted code may be performed in various alternative ways. In the case where the trigger event was the attempted execution of the code segment, then the interpreter 102 may dynamically build code that executes a call to the translated code 212. In the case where a code translation unit has been used, upon completion of block 312, an event may be caused which informs the operating system that is preparing to run the non-native code file 104, that the dynamic binary translation process is complete and that it may schedule the code for execution. In this case, when the code is selected for execution, the interpreter 102 may then execute a call to the translated code 212.

Figure 4:
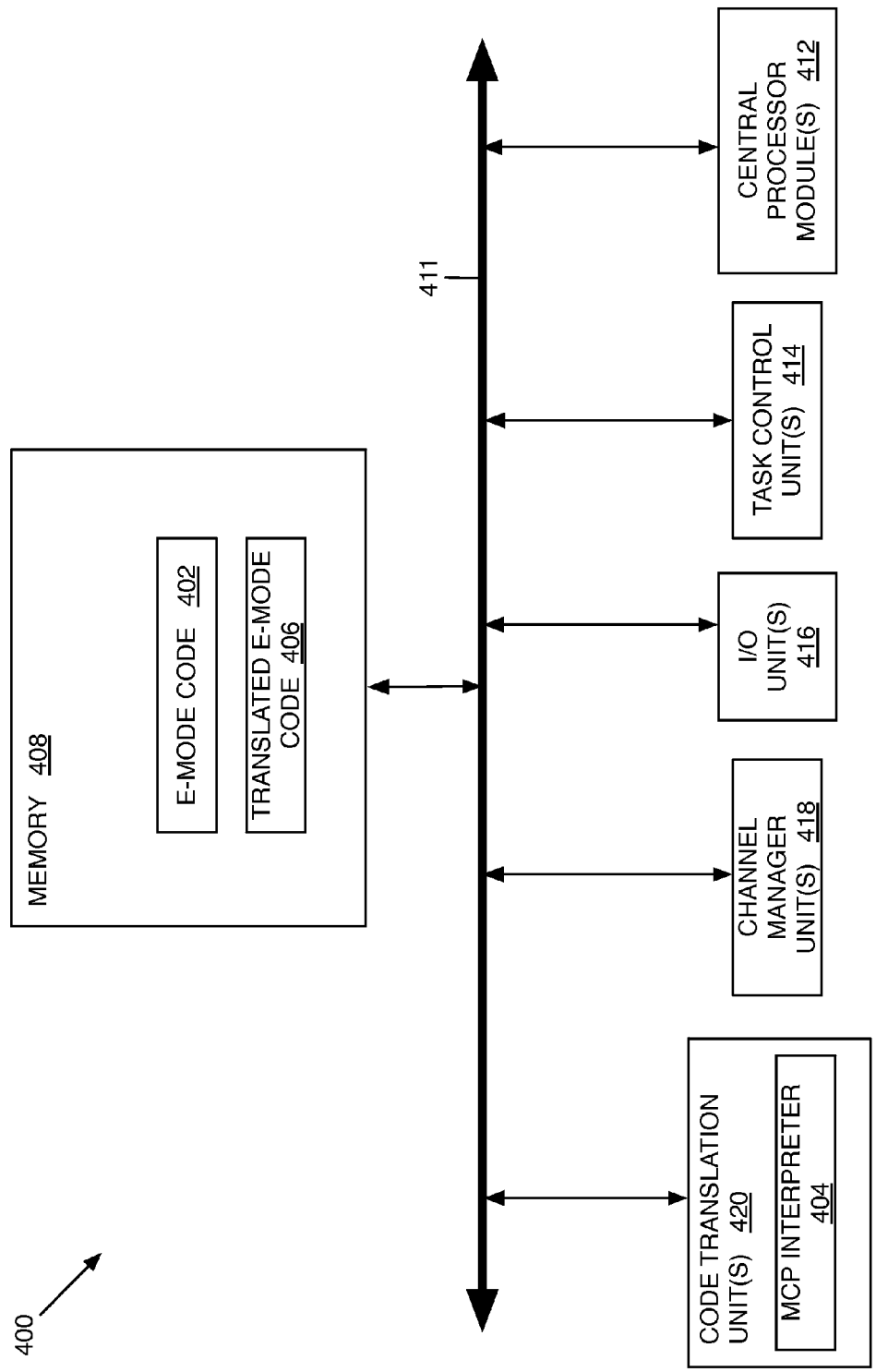
FIG. 4 is a block diagram illustrating another embodiment of a system for implementing dynamic binary translation in an interpreter.
Figure 5A:
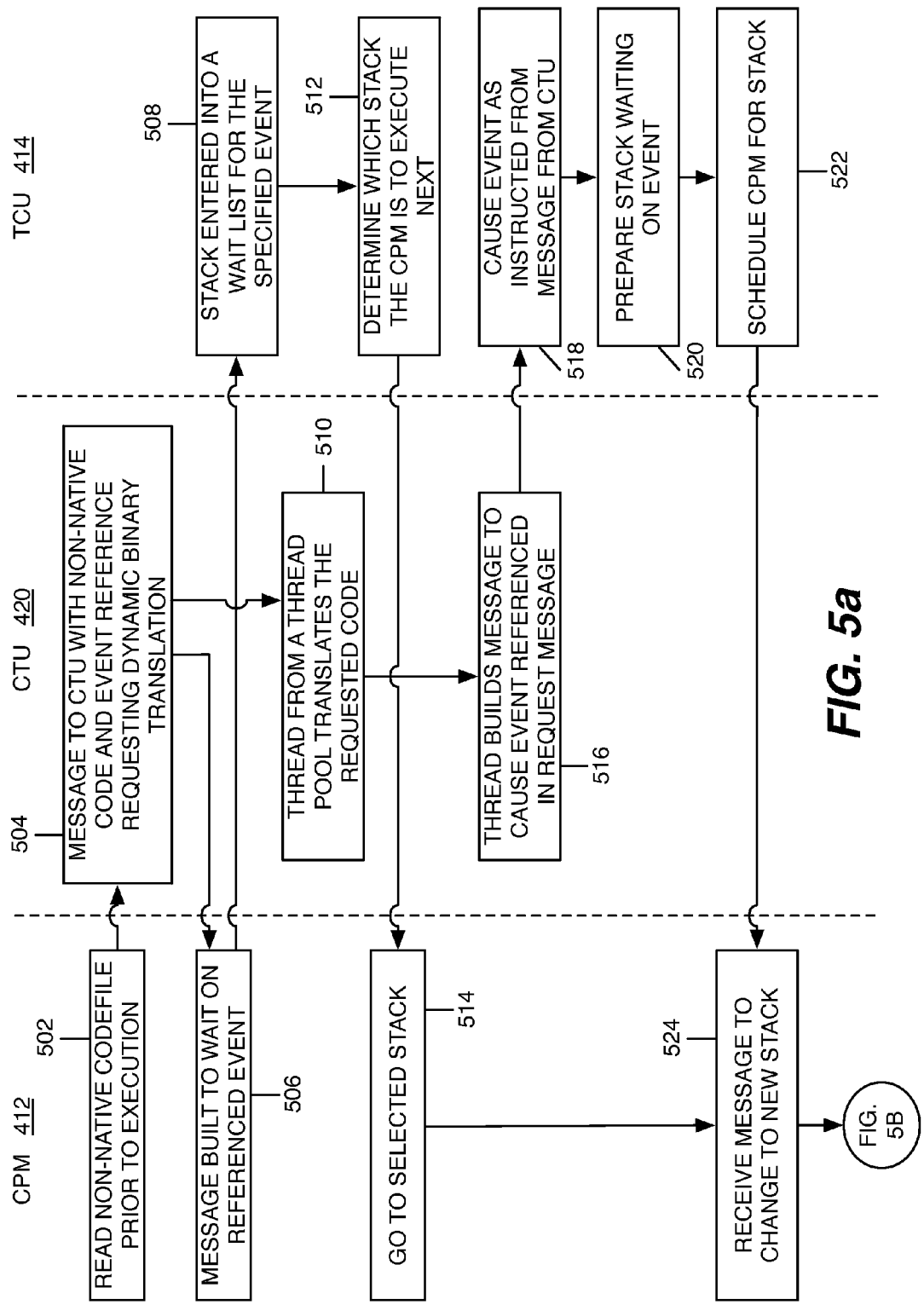

As mentioned above, the dynamic binary translation module 202 and the associated logic may be implemented in various alternative hardware and/or software systems regardless of the native environment and non-native code. FIGS. 4, 5a & 5b illustrate an alternative embodiment of a computer system 400 for implementing the dynamic binary translation module 202 in a Master Control Program (MCP) environment on, for example, a native Intel processor. As known in the art, the MCP is the proprietary operating system used in the Unisys Clearpath/MCP system. In the MCP environment, the non-native code, or foreign operators, comprises the proprietary E-Mode code 402. The native code refers to the Intel 64 and Intel architecture (IA) 32 instruction set, as documented in, for example, *The Intel 64 and IA-32 Architectures Software Developer's Manual*, consisting of the following five volumes, each of which are hereby incorporated by reference in their entirety: *Basic Architecture* (Order Number 253665); *Instruction Set Reference A-M*(Order Number 253666); *Instruction Set Reference N-Z* (Order Number 253667); *System Programming Guide, Part* 1 (Order Number 253668); and *System Programming Guide, Part* 2 (Order Number 253669).

In general, in the computer system 400, the proprietary E-Mode code 402 is interpreted by an MCP interpreter 404 and executed as translated code 406 via native Intel instructions. As illustrated in FIG. 4, the computer system 400 comprises a memory 408 that communicates, via an interface 411, with various function processors. The function processors may be implemented in hardware, software, firmware, or any combination thereof. The memory 408 comprises the E-Mode code 402 to be interpreted and executed by the MCP interpreter 404. The function processors comprise one or more central processor modules (CPM) 412, task control units (TCU) 414, input/output units (IOU) 416, channel manager units (CMU) 418, and code translation units (CTU) 420. The environment in which the MCP interpreter 404 executes is known in the art as the Resource Management Module (RMM) architecture. The components of the RMM architecture are well known in the art and generally described below.

Each CPM 412 is responsible for execution of the E-Mode code 402. In virtual machine implementations, the CPM 412 is one or more processes that embody an E-Mode or MCP interpreter 404 that is configured to execute the E-mode code 402. It should be appreciated that, in alternative embodiments, the E-Mode code 402 may be executed by, for example, hardware devices, such as, one or more application-specific integrated circuits.

The computer system 400 may comprise one or more TCUs 414, with only one TCU 414 active at a time (denoted the "distinguished" TCU). If the distinguished TCU 414 fails, alternate TCUs 414 may be brought online and be made active. The TCU 414 is responsible for scheduling CPMs 412 to stacks or regions of memory 408. In many modern operating systems, the schedule algorithms are implemented as part of the operating system. In the RMM architecture, the TCU 414 determines which stacks get scheduled onto which CPMs 412. To effectively schedule, the TCU 414 is also responsible for all the event management in the computer system 400. In this manner, the scheduling is driven by the transitions of stack state by the causing and resetting of events in the MCP environment.

The IOUs 414 are responsible for managing all the physical input/output operations on the computer system 400 as directed by the CPMs 412. The IOU 414 relies on the CMUs 418 to perform the physical data transfer from the connected peripherals to the memory 408. The CMUs 418 have connections to the physical peripherals and are delivered I/O requests via a set of queues residing the in the memory 408. The CMU 418 dequeues the requests, initiates the I/O, transfers data, and builds I/O results for the I/Os for which it is responsible. When the CMU 418 is finished with the I/O, it queues it back to the IOU 416 for I/O finish processing. It should be appreciated that the RMM modules are interconnected, have access to the memory 408 (e.g., via interface 411), and are capable of sending messages between them.

FIGS. 5a & 5b illustrate an embodiment of a method for implementing dynamic binary translation in the computer system 400. As illustrated in FIGS. 5a & 5b, dynamic binary translation in the MCP environment is a cooperative effort between existing RMM modules (CPM 412 and TCU 414) and the CTU(s) 420. The flowchart illustrates the method from the perspective of the CPM 412, the TCU 414, and the CTU 420. In this regard, it should be appreciated that the method also represents the logic and/or architecture associated each component.

At block 502, the CPM 412 reads the non-native code file (e.g., E-Mode code 402) from the memory 408 prior to execution. The CPM 412 builds a message A and sends it to the CTU 420 (block 504). The message A contains a reference to the code to be translated, as well as an event to be caused when the dynamic binary translation process is complete. A subsequent message B may be generated by the CPM 412 (block 506) and sent to the TCU 414. Message B causes the stack whose code is being translated to wait for a translation complete event. At block 508, the stack may be entered into, for example, a wait list for the specified event.

As mentioned above, the TCU 414 is generally responsible for directing CPM(s) 412 onto stacks. When block 508 completes, the stack that was active on the CPM has been entered onto a wait list. As illustrated at blocks 512 and 514, the TCU 414 instructs the CPM 412 which stack it is to execute next. In an embodiment, the operating system may maintain a ready queue that is a linked list of stacks that are ready to run. Typically, an operating system selects the stack at the head of the ready queue for execution. In the RMM embodiment, the TCU 414 employs these algorithms. Therefore, it should be appreciated that block 512 represents the algorithms employed by the TCU 414 to select the next stack for the CPM to execute. Block 514 represents the CPM 412 receiving from the TCU 414 the directive to move to the stack that was selected by the algorithm in block 512.

In an embodiment, when the CTU 420 receives the message A to translate the code, a thread pool may be used to allow multiple code segments to be translated in parallel (block 510). It should be appreciated that the thread pool may allow concurrency during the translation process. Each code segment to be translated may be given to a separate thread and is independent of every other code segment being translated. Furthermore, performance gains may be realized through a number of techniques, such as, for example, elevating the priority of the threads that do the translating and/or applying affinity to the threads to ensure that they run repeatedly on a given processor set to keep the cache hit rate high. The elevated priority may be used to place greater importance on the translation process than I/O processes.

Each thread in the thread pool may execute the translation procedure as described above in connection with the flowchart of FIG. 3. In an embodiment, upon completion of block 312 (FIG. 3), the CTU thread may build a message C (block 516) to send to the TCU 414. The message C may be configured to cause the event referenced in the message A that the CTU 420 received from the CPM 412 to request the translation. The TCU 414, upon receiving the message C from the CTU 420, causes the associated event (block 518). At block 520, the TCU 414 may prepare the stack that was waiting on the event. In an embodiment, the stack that is waiting may comprise the same stack requesting the translation to occur. Because the stack starts executing again, the MCP environment may schedule the stack in the typical manner by sending a message to the TCU 414 to insert the new stack number in the scheduling algorithms.

In an embodiment, at block 520, the TCU 414 may transition a stack from a "waiting" state to a "ready" state. When a stack enters the "ready" state, it may be entered into a ready queue. As part of the stack scheduling process, the TCU 414 may determine when it is time to transition a CPM 412 from one stack to another. The transition process may be due to, for example, the expiration of a time slice. It may also be due to the currently active stack transitioning to a waiting state and, therefore, the CPM 412 may be available to be scheduled onto a ready stack. In general, it should be appreciated that, at block 522, due to one or more of several stimuli, the stack that has had its code translated is now selected for a CPM 412 to be moved onto. At block 524 the CPM 412 may receive a message D from the TCU 414 indicating which stack it is to execute.

As the CPM 412, resumes the stack that was attempting to start the new program in the operating system instantiated by the code which is executing on the CPM(s) 412, (e.g., the same stack block 502 was executing), the operating system (i.e., the MCP, in the embodiment of FIG. 4) knows that the new stack has been translated and a new stack needs to be created in order to instantiate the new program. At block 526, the operating system may build the necessary stack structure in memory 402. Upon attaining a structure sufficient for execution to begin, the operating system may build a directive for the TCU 414 to insert this new stack into the "ready queue". Block 528 represents the process of transferring that directive to the TCU 414. Block 530 represents the TCU 414 receiving the directive and performing the requested action (e.g., inserting the stack into the ready queue).

At block 532, with the stack in the ready queue, the same algorithms employed in block 522 may be employed in block 532. At block 534, the selected stack may be moved onto the CPM 412. It should be appreciated that the newly inserted stack may advance to the head of the ready queue and be scheduled for actual execution on a CPM 412. At block 534, the translated E-mode code 406 is entered and executed. When the CPM 414 moves to the requested stack, the translated E-mode code 406 is executed.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

The invention claimed is:

1. A method for performing dynamic binary translation in a Master Control Program (MCP) environment on a native processor, the MCP environment comprising a central processor module (CPM), a task control unit (TCU), and a code translation unit (CTU) for implementing the dynamic binary translation, the method comprising:

the CPM reading E-Mode code from a memory prior to execution;

the CPM generating and sending a first message to the CTU, the first message comprising a reference to the E-Mode code to be translated and a translation complete event to be caused when translation of the E-Mode code is completed;

the CPM generating and sending a second message to the TCU, the second message configured to cause a first stack to wait for the translation complete event, the first stack comprising at least a first portion of the E-Mode code to be translated;

based on the second message, the TCU instructing the CPM to move to a second stack comprising at least a second portion of the E-Mode code to be translated;

based on the first message, the CTU translating the first portion of the E-Mode code to native code;

the CTU generating and sending a third message to the TCU, the third message configured to cause the translation complete event;

based on the third message, the TCU causing the translation complete event;

the TCU preparing the second stack and scheduling the CPM to the second stack; and the CPM executing the native code.

2. The method of claim 1, wherein the CTU translating the E-Mode code comprises:

receiving non-native code comprising a sequence of one or more operators to be interpreted;

building a static branch destination table associated with the operators, the static branch destination table specifying a static branch operator that branches to another operator in the sequence and a corresponding memory location to which the static branch operator branches;

parsing the sequence of operators and building a cross-reference table that specifies a pointer to an operator function associated with the corresponding operator, an index of the operator in a native code sequence, and a call to a native operator;

selecting a dynamic branch code template for the native operator; and based on the static branch table and the cross-reference table, emitting the native code sequence to be executed via a native processor.

3. The method of claim 2, wherein the emitted machine code comprises a sequence of calls to a corresponding routine that executes the associated operator via a native processor.

4. The method of claim 2, wherein the emitted machine code comprises a sequence of calls to a corresponding memory address of a location of the associated operator.

5. The method of claim 2, wherein the receiving the non-native code comprises receiving a message from an interpreted operating system.

6. The method of claim 2, wherein the receiving the non-native code comprises receiving a memory address associated with the non-native code.

7. The method of claim 2, wherein the parsing the sequence of operators comprises an optimization technique.

8. The method of claim 7, wherein the optimization technique comprises concatenating two or more of the operators.

9. The method of claim 7, wherein the optimization technique comprises employing two or more implementations of an operator wherein each implementation has a unique set of assumptions.

10. The method of claim 9, wherein the selecting the dynamic branch code template comprises selecting one of the two or more implementations of the operator that matches the unique set of assumptions.

11. The method of claim 2, wherein the selecting the dynamic branch code template comprises automatically or manually generating a routine that implements the native operator.

12. The method of claim 11, wherein the generated routine conforms to the Application Binary Interface in which the interpreter is executing.

13. The method of claim 2, wherein the emitting the native code sequence comprises allocating a memory area within an address range of a native processor.

14. The method of claim 1, wherein the native code is executed on a native Intel processor.

* * * * *